US 6,834,309 B2

United States Patent
Leung

(12) United States Patent
(10) Patent No.: US 6,834,309 B2
(45) Date of Patent: Dec. 21, 2004

(54) SOCKET TOOL HAVING DATA TRANSFER CONTROL CODES, FILE TRANSFER CONTROL CODES, AND DATA AND FILE TRANSFER PROGRESS INDICATION CODES FOR CONNECTION AND COMMUNICATION OF SQL APPLICATION

(76) Inventor: Kwok-Yan Leung, 53 Applegate Cres, Willowdale, On (CA), M2H 2R5

( * ) Notice: Subject to any disclaimer, the term of this patent is extended or adjusted under 35 U.S.C. 154(b) by 462 days.

(21) Appl. No.: 09/867,454

(22) Filed: May 31, 2001

(65) Prior Publication Data

US 2003/0033444 A1 Feb. 13, 2003

(51) Int. Cl.$^7$ ................................................ G06F 15/16
(52) U.S. Cl. ...................... 709/232; 709/217; 709/218; 709/219; 709/227; 709/228; 709/230; 709/238; 707/4; 707/9; 707/10
(58) Field of Search ................................. 709/217–219, 709/227–228, 230, 232, 238, 310–340; 707/4, 9, 10

(56) References Cited

U.S. PATENT DOCUMENTS

| | | | | |
|---|---|---|---|---|
| 5,537,417 A | * | 7/1996 | Sharma et al. ............. 709/228 |
| 5,899,990 A | * | 5/1999 | Maritzen et al. ............... 707/4 |
| 6,047,324 A | * | 4/2000 | Ford et al. .................. 709/227 |
| 6,219,669 B1 | * | 4/2001 | Haff et al. .................... 707/10 |
| 6,370,569 B1 | * | 4/2002 | Austin ........................ 709/217 |
| 6,449,601 B1 | * | 9/2002 | Friedland et al. ............. 705/37 |
| 6,504,926 B1 | * | 1/2003 | Edelson et al. ........ 379/390.01 |
| 2002/0112237 A1 | * | 8/2002 | Kelts ........................... 725/39 |

OTHER PUBLICATIONS

W. Richard Stevens, Unix Network Programming, Prentice Hall, vol. 1, Second Edition, pp. 85–107 and 273–288.*

* cited by examiner

*Primary Examiner*—Nabil El-Hady
(74) *Attorney, Agent, or Firm*—Bacon & Thomas, PLLC

(57) ABSTRACT

A socket tool is embodied in form of coded codes and executed in a computer for its inside application software to "call" to connect and communicate with that of another computer, wherein the socket tool comprises a set of Socket control codes for TCP network connection basing on the Transmission Control Protocol (TCP) and a value-incremental code for dealing with data to be transmitted by the application layer software.

11 Claims, 4 Drawing Sheets

| Conventional Winsock | this invention |
|---|---|
| Methods:<br>Accept<br>Close<br>Connect<br>GetData<br>Listen<br>SendData | Methods:<br>SAccept<br>SClose<br>SConnect<br>SGetData<br>SListen<br>SSendData<br>SGetFileName<br>SSendFile |
| Event:<br>Close<br>ConnectionRequest<br>DataArrival<br>Error<br>SendComplete<br>SendProgress | Event:<br>SClose<br>SConnectionRequest<br>SDataArrival<br>SError<br>SSendComplete<br>SConnected<br>SFileArrival<br>ConnectionTimeOut |

FIG. 2

SOCKET TOOL HAVING DATA TRANSFER CONTROL CODES, FILE TRANSFER CONTROL CODES, AND DATA AND FILE TRANSFER PROGRESS INDICATION CODES FOR CONNECTION AND COMMUNICATION OF SQL APPLICATION

FIELD OF THE INVENTION

This invention relates to a socket tool, particularly to a socket tool for connection and communication of application layer software under regulations of the Transmission Control Protocol (TCP).

BACKGROUND OF THE INVENTION

As the conventional WinSock (Windows Socket) is an industrial standard interface erected by the companies Microsoft, Novell, Sun microsystem, etc., based on the Berkeley Socket under regulations of the Transmission Control Protocol (TCP), therefore, all the application programs stemmed from the Windows Operating System can go connecting with the TCP networks. And because the WinSock is existed in form of a Dynamic-Link Library (DLL), any of the mentioned application programs may call WinSock.DLL for proceeding, however, some defects are found in developing application programs based on the WinSock in cooperation with the Windows Operating System.

SUMMARY OF THE INVENTION

The primary object of this invention is to provide a socket tool for connection and communication of application layer software under regulations of the Transmission Control Protocol.

Another object of this invention is to provide value-incremental codes for enhancement of security, confidentiality, and speed in network transmission.

In order to realize abovesaid objects, the socket tool is embodied in form of coded codes and executed in a computer for its inside application software to "call" to connect and communicate with that of another computer, wherein the socket tool comprises a set of Socket control codes for TCP network connection basing on the Transmission Control Protocol (TCP) and a value-incremental code for dealing with data to be transmitted by the application layer software.

Furthermore, the socket tool of this invention also comprises a set of value-incremental codes for dealing with data to be transmitted by the application layer software.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which:

FIG. 2 is a comparison table of the socket tool of this invention and a conventional WinSock;

DETAILED DESCRIPTION OF THE INVENTION

Figure 1:
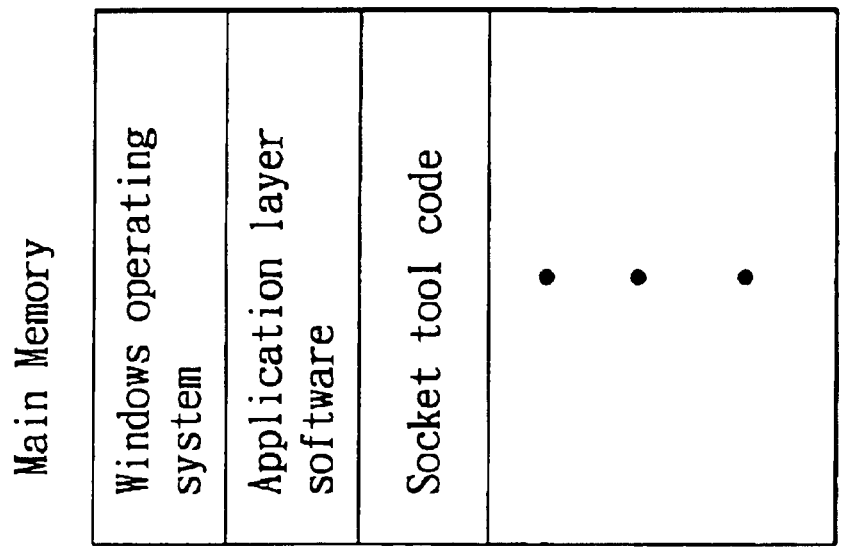
FIG. 1 shows the state of a main memory when a socket tool of this invention is applied in a personal computer under the Windows operating environment.

As shown in FIG. 1—the state of a main memory when a socket tool of this invention is applied in a personal computer (PC) under the Windows operating environment—the main memory in the PC comprises at least: a Windows operating System, such as Windows 98 Operating System; an application layer software, such as the database application software of SQL (Structured Query Language); and a socket tool code, which is embodied in form of a DLL code for the application layer software to "call".

In a comparison table of the socket tool of this invention and a conventional WinSock shown in FIG. 2, a plurality of Socket control codes of this invention for network transmission is so regulated basing on the Transmission Control Protocol (TCP) only while the WinSock of Microsoft on the TCP or the User Datagram Protocol (UDP) that an application layer software of FTP (File Transfer Protocol) may occasionally lose data in file download operation by using the conventional WinSock, particularly in the case of picture transmission of MP3 (MPEG layer 3) or JPEG (Joint Photographic Expert Group) because of the WinSock's bugs. It is not the case in the plurality of Socket control codes of the socket tool of this invention, which is object oriented and divided into two parts—methods and events.

The Socket control codes of the socket tool of this invention and the syntax thereof are listed below:

.SClose~To terminate the connection between a server computer and a client computer; syntax: IpSock.SClose;

.SConnect~To build connection by using IP (Internet Protocol) strings and Port parameters of a server computer; syntax: IpSock.SConnect Cstr (IP), Cstr (Port); example:
Ren Ws is the name of IpSock
txtIp="191.164.0.6", txtPort="1064"
Ws.SConnect TxtIp, txtPort .SGetData~To transfer back a designated string obtained by executing a SQL (Structured Query Language) instruction to a database; syntax: IpSock.SGetData; example:
Dim DisplayStr As String
Ren Ws is the name of IpSock
DisplayStr=Ws.SGetData .SSendData~To upload length and parameter of a SQL instruction string from a client computer to a server computer; syntax: IpSock.SSendData LenthofExecSQLCmdStr & "|" & ExecSQLCmdStr; example:
Ren Ws is the name of IpSock
Dim Execstr=String
Execstr="SELECT*FROM employee"
Ws.SendData Len (Execstr) & "|" & Execstr .State~To transfer back a state value; syntax: Object.State; wherein the state values are listed as the following:

| State value | Description |
|---|---|
| 0 | Default, Closed |
| 1 | Open |

-continued

| State value | Description |
|---|---|
| 2 | Listening |
| 3 | Connecting, pending |
| 4 | Resolving host |
| 5 | Host resolved |
| 6 | Connecting |
| 7 | Connected |
| 8 | Peer is closing the connection |
| 9 | Error |

Str2rec~To transfer back a designated a record set or an instruction string by import of a string or a function; syntax: StroRec.Str2rec; example:
Dim rs As New ADODB.Recordset
Dim StrtoRec As New StrtoRec.str2rec
Dim DisplayStr As String, DataResult As String
DisplayStr=Ws.SGetData
If StrtoRec.str2rec(DisplayStr, rs, DataResult)

```
= "OK" Then
If DataResult = "" Then
    If rs.RecordCount > 0 Then
        Ren DG1 is a DataGrid
        Set DG1.DataSource = rs.DataSource
    End If
    Set rs = Nothing
Else
    MsgBox "Result" = "& DataResult"
End If
Else
    MsgBox "ERROR"
End If
```

Figure 3:
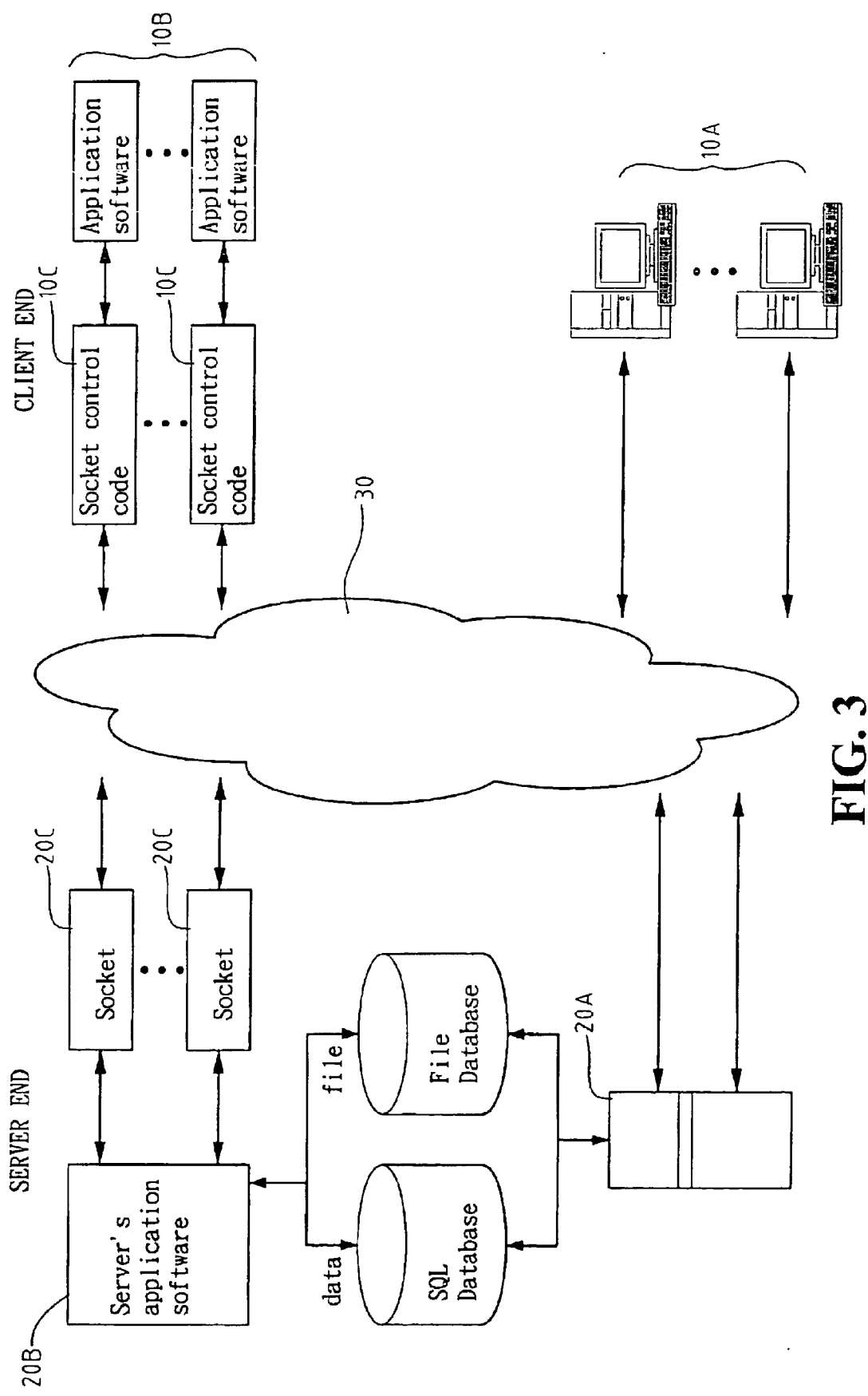
FIG. 3 is a block diagram showing an application example of Socket control codes of the socket tool applied in e-business.

FIG. 3 is a block diagram showing an application example of Socket control codes of the socket tool applied in e-business. As this figure indicates, a plurality of client computers 10A are connected with an Internet Service Provider's (ISP's) server computer 20A via Intranet/Internet 30 in order to browse related web pages for doing e-business. At this moment, each client computer 10A may run respective application software 10B, such as a database program of SQL software, a file download program, an application program of browser software, however, all the client computers 10A are taking the advantage of a Socket control code 10C of the socket tool of this invention for realizing data or file transmission. Meanwhile, the server computer 20A also runs the Socket control code 10C to generate a plurality of soft Sockets 20C corresponding to the amount of the client computer 10A and executes a server's application software 20B developed to associate with the socket tool, for example, a SQL Access Server for accessing a SQL database or a file database and transferring the accessed data or files to each corresponding application software 10B of the client computer 10A via the Sockets 20C.

Figure 4:
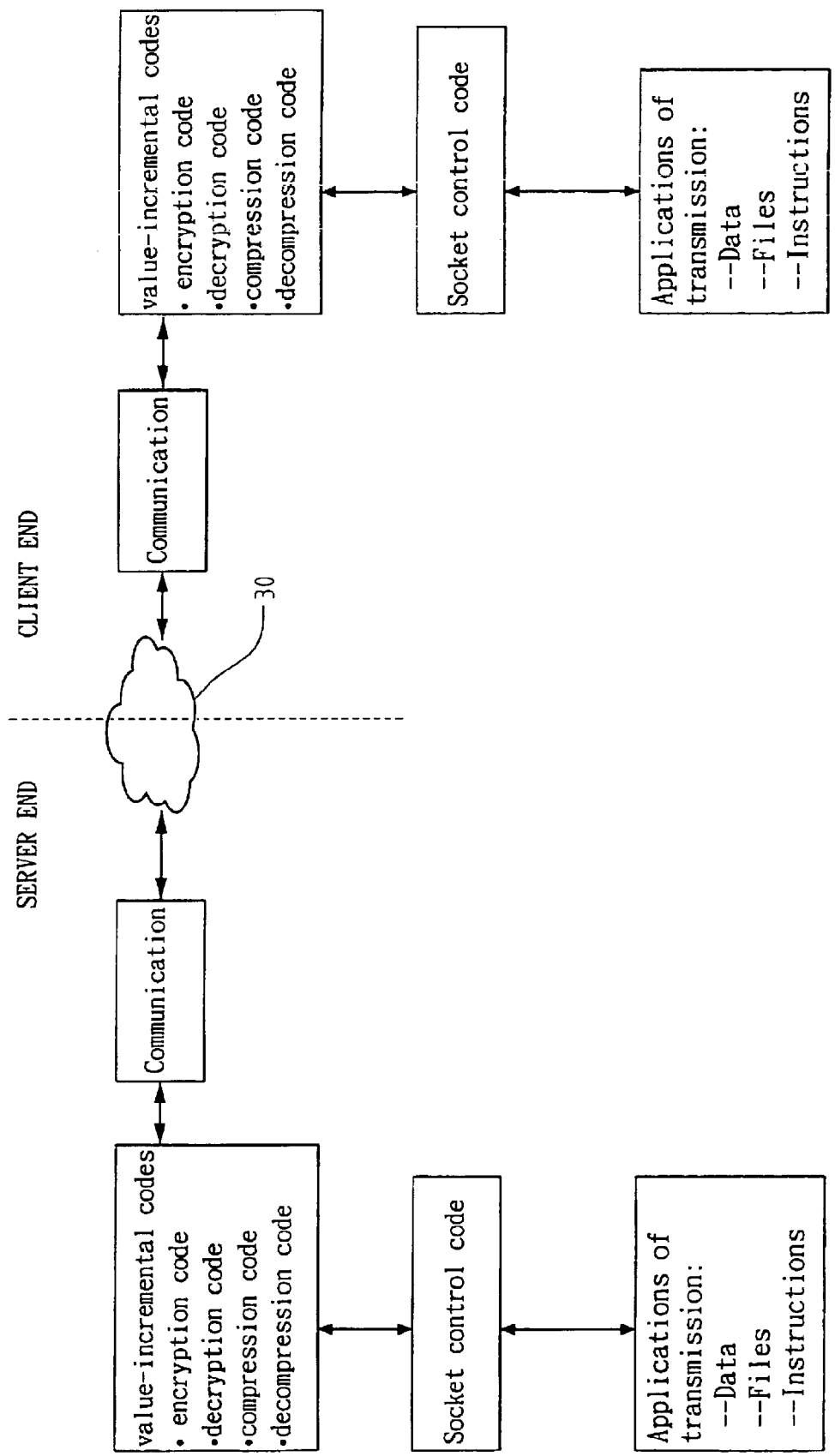
FIG. 4 is a block diagram showing a value-incremental code of the socket tool applied in a network environment having a server end and a client end.

FIG. 4 is a block diagram showing a value-incremental code of the socket tool applied in a network environment having a server end and a client end. As shown in the figure, the socket tool of this invention further comprises a set of value-incremental codes for dealing with data to be transmitted by an application layer software, including at least an encryption code and a decryption code, or at least a compression code and a decompression code. The value-incremental codes of the socket tool are elaborated in security, confidentiality, and speed of the network transmission.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A socket tool for connection and communication of application layer software, the socket tool including coded codes executed in a computer and arranged to be called by application layer software to enable the application layer software to connect and communicate with application layer software of another computer under regulations of the Transmission Control Protocol (TCP), wherein the socket tool comprises a set of socket control codes for a TCP network connection based on the Transmission Control Protocol, said socket control codes including both a data transfer control code related to the application layer software and file transfer control codes, said socket control codes further including control codes for indicating both data and file transfer progress wherein said data transfer code related to the application layer software includes a code for uploading a length and parameter of an SQL instruction string to a database and a code for transferring back a designated string obtained by executing an SQL instruction to said database.

2. The socket tool according to claim 1, further comprising a set of value-incremental codes for dealing with data to be transmitted by the application layer software.

3. The socket tool according to claim 1, wherein the set of socket control codes comprises at least a "SAccept" code, a "SClose" code, a "SConnect" code, a SGetData" code, a "SListen" code, a "SSendData" code, a "SGetFileName" code, a "SSendFile", a "SConnectionRequest" code, a "SDataArrival" code, a "SError" code, a "SSendComplete" code, a "SFileArrival" code, and a "ConnectionTimeOut" code.

4. The socket tool according to claim 2, wherein the set of value-incremental codes includes at least an encryption code and a decryption code.

5. The socket tool according to claim 2, wherein the set of value-incremental codes includes at least a compression code and a decompression code.

6. The socket tool according to claim 1, wherein the application layer software is a SQL database software.

7. The socket tool according to claim 1, wherein the application layer software is an application software for downloading files.

8. The socket tool according to claim 7, wherein a downloaded file is a MP3 song file, a GIF format picture file, a JPG format picture file, or a moving picture format file.

9. The socket tool according to claim 1, wherein the application layer software is a chat application software.

10. The socket tool according to claim 1, wherein said data transfer control code related to the application layer software includes an "SGetData" code for transferring back a designated string obtained by executing a SQL instruction to a database.

11. The socket tool according to claim 1, wherein said data transfer control code related to the application layer software includes an "SSendData" code for uploading a length and parameter of an SQL instruction string from a client computer to a server computer.

* * * * *